No. 663,845. Patented Dec. 18, 1900.
H. L. BAILEY.
AUTOMATIC VEHICLE BRAKE.
(Application filed Aug. 20, 1898.)
(No Model.) 3 Sheets—Sheet 1.
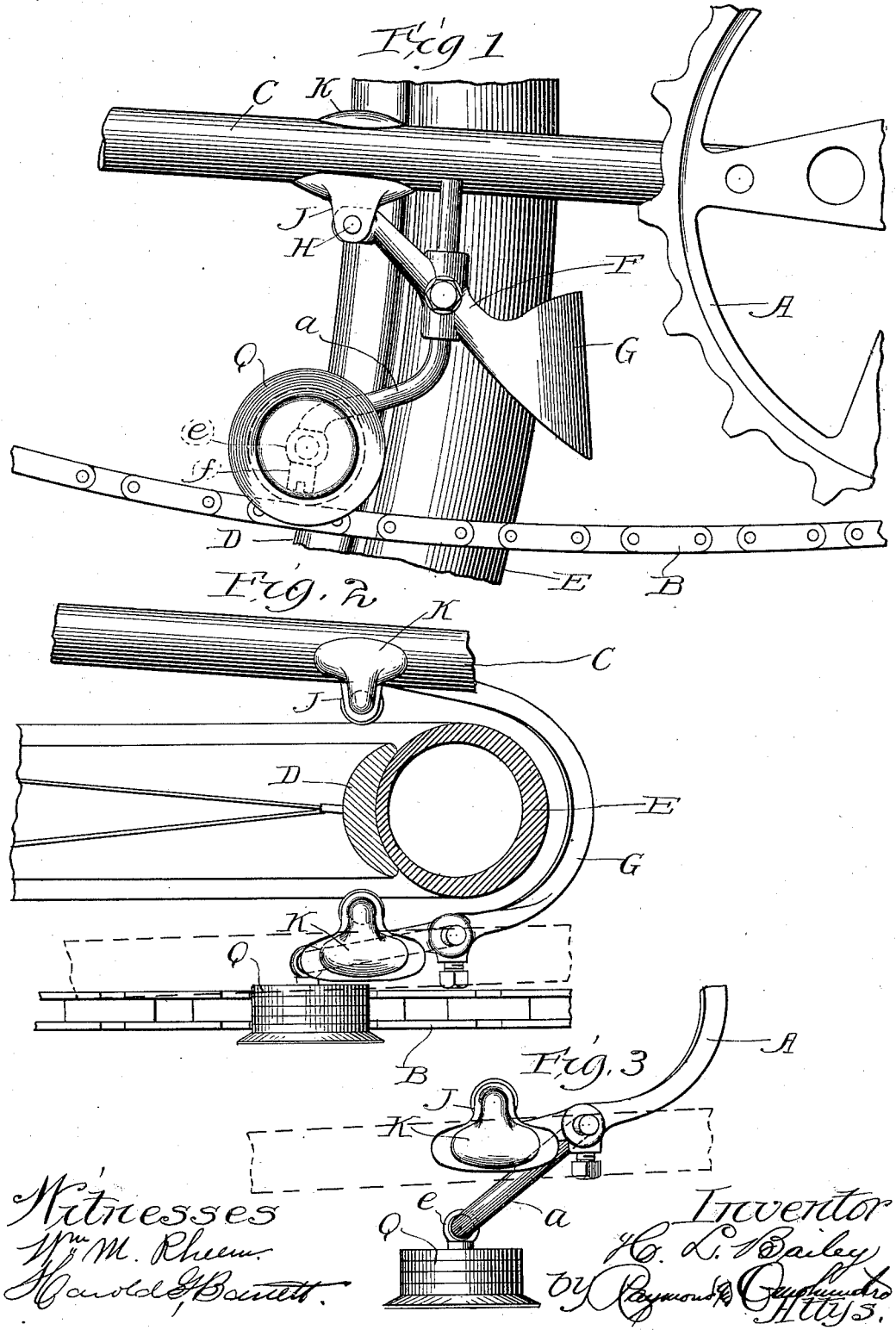

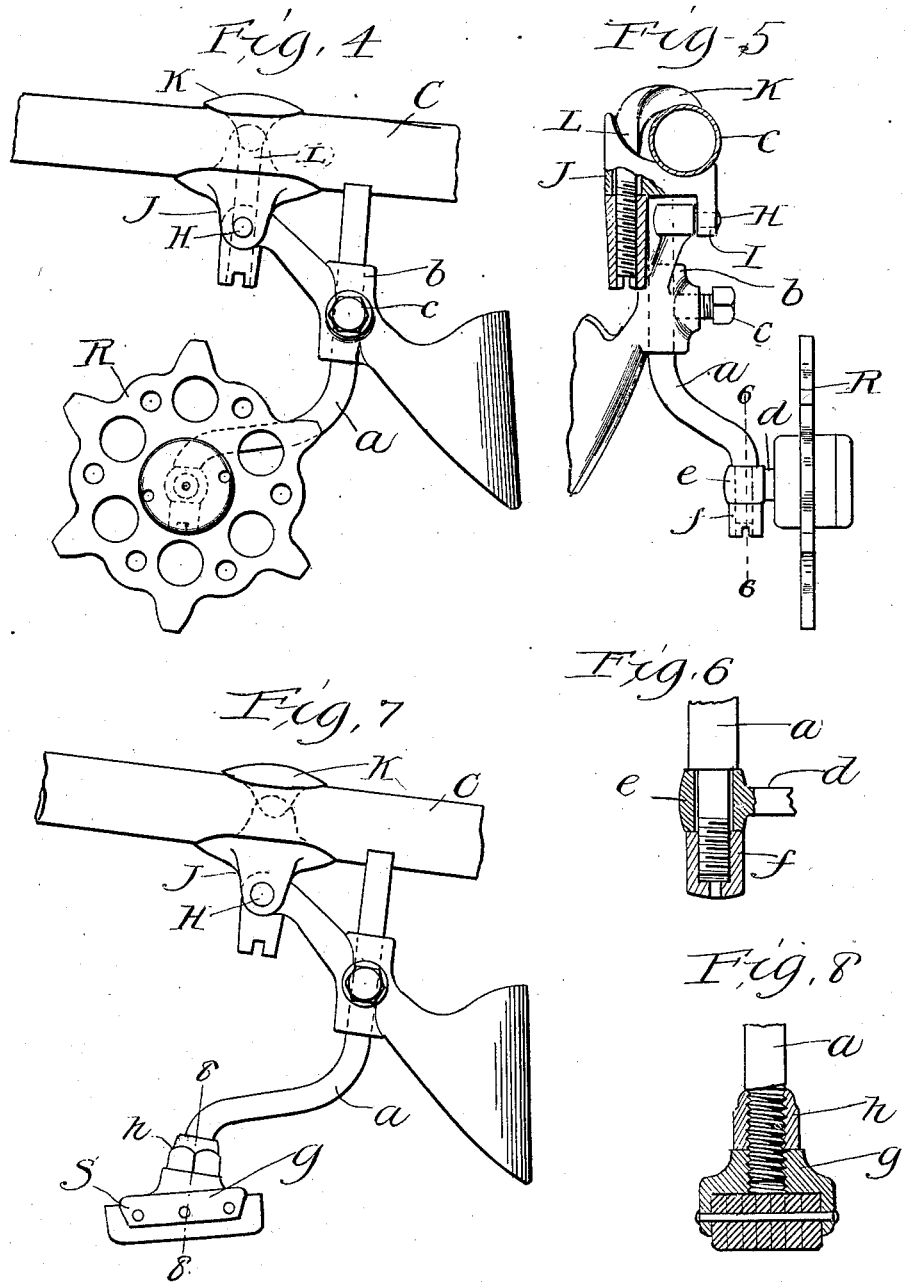

No. 663,845. Patented Dec. 18, 1900.
H. L. BAILEY.
AUTOMATIC VEHICLE BRAKE.
(Application filed Aug. 20, 1898.)
(No Model.) 3 Sheets—Sheet 3.
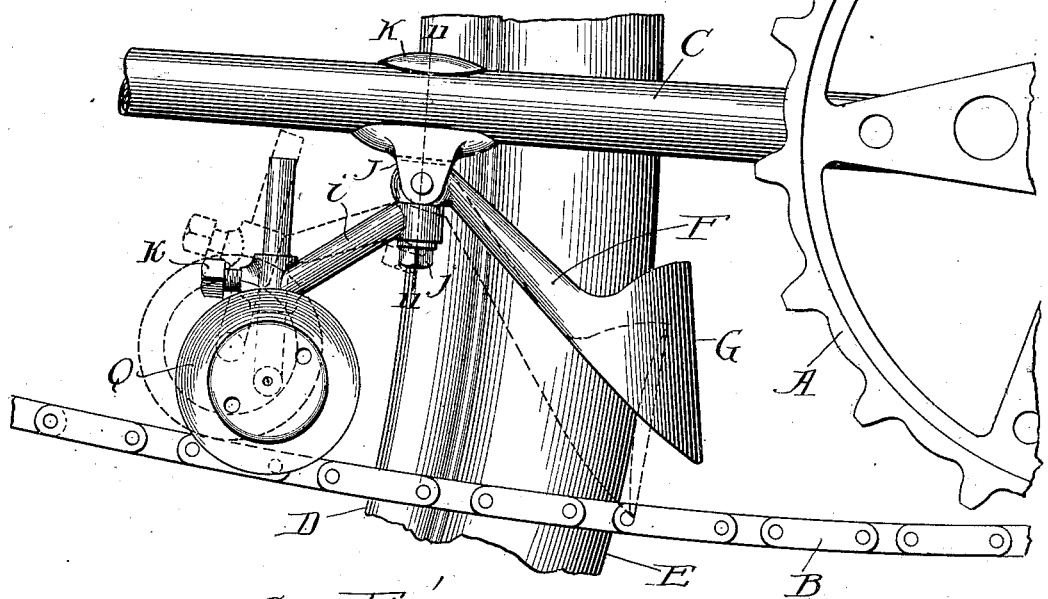
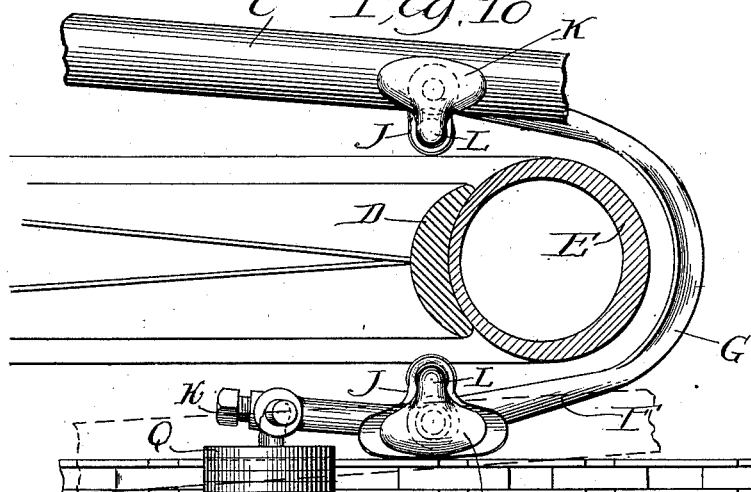
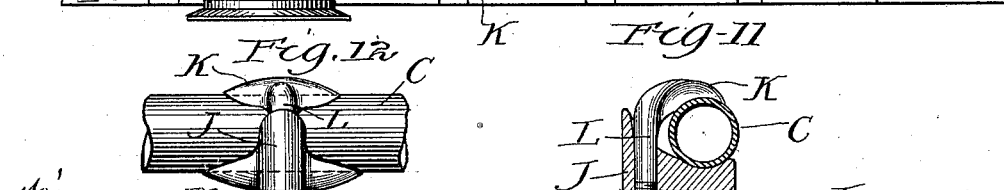

UNITED STATES PATENT OFFICE.

HERBERT L. BAILEY, OF CHICAGO, ILLINOIS, ASSIGNOR TO THE HANDY THINGS COMPANY, OF SAME PLACE.

AUTOMATIC VEHICLE-BRAKE.

SPECIFICATION forming part of Letters Patent No. 663,845, dated December 18, 1900.

Application filed August 20, 1898. Serial No. 689,109. (No model.)

*To all whom it may concern:*

Be it known that I, HERBERT L. BAILEY, a citizen of the United States, and a resident of the city of Chicago, in the county of Cook and State of Illinois, have invented certain new and useful Improvements in Automatic Vehicle-Brakes, of which the following is a full, clear, and exact description, reference being had to the accompanying drawings, forming a part hereof.

This invention relates to improvements in automatic vehicle-brakes, especially designed for use in connection with bicycles, tricycles, and similar vehicles in which the brake is applied by back pressure upon the driving-pedals of the machine, but relates more particularly to that class of vehicles that are chain-driven and in which the lateral movement of the normally slack side of the driving-chain induced by back-pedaling is utilized to apply the brakes.

The primary object of my invention is simplicity of construction, effectiveness, capability of applying any degree of power between the maximum and the minimum, and adjustability for attachment to differing machines.

Another object is the utilization of a rigid bail as a brake-spoon and support therefor, with means combined therewith for actuation by the driving-chain.

A further object is the provision of simple and effective means for adapting such a brake device for use in connection with differing machines which shall be inexpensive and not liable to easy destruction, clogging, or other obstruction to their operation.

These and such other objects as may hereinafter appear are attained by the device illustrated in the accompanying drawings, in which—

Figure 1 represents a detailed side elevation of a portion of a chain-driven vehicle, showing the preferred form of brake embodying my invention applied thereto. Fig. 2 represents a plan view of the same. Fig. 3 represents a detailed plan view showing the adjustment of the brake for a different machine. Fig. 4 is a detailed side elevation showing a modified form of chain-engaging device. Fig. 5 represents a rear elevation thereof. Fig. 6 is a detailed section on the line 6 6 of Fig. 5. Fig. 7 is a detailed elevation showing another modified form of chain-engaging device. Fig. 8 is a detailed section on the line 8 8 of Fig. 7. Figs. 9 and 10 are elevation and plan views, respectively, similar to Figs. 1 and 2, but illustrating a modified form of my brake. Fig. 11 is a detailed section on the line 11 11 of Fig. 9. Fig. 12 is a detailed elevation showing the spring-clip attachment of one end of the bail to the frame of the machine.

Similar letters of reference indicate the same parts in the several figures of the drawings.

Referring by letter to the accompanying drawings, A indicates the drive sprocket-wheel, and B the sprocket-chain, trained around said wheel and around the driven sprocket-wheel of the driving-wheel of the machine, all of which is now so well understood in the art as not to require illustrating herein. The fork C illustrated in the drawings is preferably the rear fork of a bicycle, D indicating the rim of the rear wheel, and E the tire, it being the purpose of my invention to have the brake applied to the rear or driving wheel of a bicycle, although it may be applied to any other chain-driven vehicle or in any other position where the force exerted by back-pedaling or back pressure, which takes the slack out of the normally slack side of the driving-chain, may be utilized to apply the brakes.

To the rear fork, at each side of the wheel and adjacent to the rim thereof, is pivotally connected the ends of a rigid bail F, which constitutes the brake-spoon and hanger therefor. I prefer to enlarge or broaden the bail at its center, as at G, so as to increase the area of that part of the bail which makes contact with the wheel-tire, and thus avoid the danger of injury to the tire which might result if a narrow part were used, for the brake may be applied with sufficient power to arrest the rotation of the wheel, and I have found by experience that a narrow bail is more prompt and sudden in its action than is desirable.

Each end of the bail may be formed into an eye to receive the pivot therefor; but I prefer to form a laterally and outwardly extending stud H on each end of the bail, which fits in a perforated lug I, depending from the lower half of the clip J, by which the bail is adjustably secured to the fork-bars, the upper portion of the clip consisting of a hook K, engaging the top of the fork-bar and provided with a screw-threaded shank L, passing loosely through the lower half J of the clip to receive a nut M on the lower end thereof, as illustrated in Fig. 5, whereby the two parts of the clip may be caused to tightly clamp the fork-bars at any point.

I prefer to have the brake-bail yieldingly maintained in its normally-elevated position out of contact with the wheel-rim, and to this end any spring device accomplishing the desired purpose may be employed. In Fig. 12 I have illustrated a simple device for this purpose consisting of a U-shaped flat spring N, embracing one end of the bail, having a laterally-perforated ear through which the shank of the clip passes, the body of the spring being interposed between the end of the bail and the lower part of the clip. The two ends O and P of the spring terminate forward of the clip and in contact with the end thereof forward of the bail, the normal tension of the spring serving to hold the bail in its normal position. When, however, the bail is swung down upon its pivots, as hereinafter described, the arm P will yield under such pressure; but as soon as the pressure is withdrawn or relieved the arm P will cause the bail to rise and resume its normal position.

By means of the clips the brake-bail may be adjusted toward and away from the wheel-tire to such position as may be desirable for the operation thereof, which position will depend, of course, upon the amount of slack in the chain, for the greater the slack the more movement can be imparted to the bail, and of course it is desirable that the distance between the brake-bail and the wheel-tire should normally be great enough to prevent clogging with mud. I have found by practice that a space of one-half to three-quarters of an inch may be left and yet all of the movement necessary for the application of the brakes be obtained with a very moderate amount of slack in the chain, for the chain-engaging devices are applied at such a point that the greatest movement of the chain is obtained, and, indeed, by the employment of a sufficiently stiff spring for the brake-bail my device can be used as a chain-tightener or slack take-up without an objectionable amount of friction, which therefore enables the safe and satisfactory operation of the machine with an abnormally slack chain, and when such a slack chain is used the brake-bail may be set an inch or more away from the tire. It is not necessary to have the brake so delicate or prompt in its operation, and slight back pressure may be applied in slowing down the speed without the necessity for applying the brake at all.

The chain-engaging device may be either the flanged roller Q, of rubber, (illustrated in the preferred construction and in Figs. 9 and 10,) which is intended to ride upon the top of the slack side of the chain, or it may be a toothed sprocket-wheel R, such as that illustrated in Figs. 4 and 5, the teeth of which engage the links of the sprocket-chain and the wheel, rotating continuously, or it may be simply a shoe S, of rawhide or leather, such as is illustrated in Figs. 7 and 8.

Both the roller Q and sprocket-wheel R may be provided with ball-bearings, so as to reduce the friction occasioned by their rotation as a result of contact with the sprocket-chain. These contacting devices may be attached to the brake-bail in any suitable manner, the preferred construction being that illustrated in Figs. 1 to 8, inclusive, this being the simplest construction known to me and one which provides a ready means of adjustment for wheels in which the location of the chain with relation to the rear forks may vary considerably. This means of adjustment consists of a bent rod $a$, the one end of which passes vertically through a suitable bearing $b$, formed on the bail about midway between its center and one end thereof, a set-screw $c$, threaded through the side of the bearing, constituting a ready means for adjusting and securing the rod in position in the bearing. This pivotal connection serves as a means of adjusting the chain-engaging device laterally and vertically, as the free end of the rod carrying the chain-engaging device will swing upon an arc struck from the axis of that portion of the rod passing through the bearing. This adjustment is clearly shown in Fig. 3, in which the chain is shown as passing the brake farther out from the rear fork than in Figs. 1 and 2. This adjustment also provides for adaptation of the brake to greater or less slack in the chain or to wheels in which the chain runs past the rear fork at different distances below the same, the adjustment for this purpose being effected by sliding the rod $a$ up or down through the bearing $b$ and securing the same at the desired point. Of course when these adjustments are made it is necessary also to adjust the chain-contacting device to line up with the chain, and this I accomplish where the roller or sprocket-wheel is used by mounting the same upon a stud-shaft $d$, projecting from an eye $e$, through which freely passes the threaded end of the rod $a$ to receive a nut $f$ on the lower end thereof, the eye being firmly clamped between said nut and a shoulder on the rod $a$, as illustrated in Fig. 6. This connection enables the rotation of the chain-engaging device in a vertical plane about the axis of the free end of the rod $a$, so that the wheel or roller may be brought to aline with the sprocket-chain and caused to rotate upon an axis at right angles to the travel of the same.

With the construction of chain-engaging device illustrated in Figs. 7 and 8 the frame $g$ of the shoe is screw-threaded to fit upon the end of the rod $a$, so that it may be rotated to any desired position, and is secured in such position by the lock-nut $h$, which is threaded upon the rod above the shoe.

In all three of the constructions shown in Figs. 1 to 8, inclusive, it may be observed that the center of the chain-engaging device is to the rear of the pivots of the brake-bail—that is to say, the brake-bail extends to one side of its pivot, while the chain-contacting device extends to the opposite side of the pivots of said bail—so that when the sprocket-chain is lifted by having the slack taken out of the same the chain-contacting device is correspondingly lifted, while the brake-bail is thrown down, and thus brought to bear upon the wheel-tire. This disposition of the parts is necessary in the constructions illustrated, because if the contacting devices were on the same side of the pivots as the brake-bail the latter would be lifted instead of being swung down into engagement with the wheel-tire.

In Figs. 9 and 10 I have illustrated a modification of my invention in which the brake-bail and the arm carrying the chain-contacting device constitute a lever of the first class, with the pivot of the bail as the fulcrum therefor; but in other respects the action of the brake is identical with that previously described. In this construction I prefer the arm $i$, proceeding rearwardly from the pivot of the bail, but having a pivotal connection with the bail at right angles to the axis of the bail-pivots, this being afforded by a set-screw $j$, passing freely through an eye and engaging a threaded hole in the end of the bail. By this arm the lateral adjustment of the chain-contacting device is secured. The vertical adjustment of the chain-contacting device, as well as the proper alinement thereof, is secured by means of an angular rod on the horizontal portion of which the chain-contacting device is loosely journaled, while the vertical portion of said rod passes loosely through the bearing formed in the outer end of the arm $i$, a set-screw $k$ being provided for locking the rod in any adjusted position.

The numerous advantages of a brake constructed in accordance with this invention are apparent, though many of them have been hereinabove set forth, chief among which may be mentioned the simplicity of the brake, the few parts and small cost of manufacture, the great strength and rigidity thereof, and the readiness of adjustability of the parts to fit different machines.

Another advantage which I may mention of having the center of the bail flattened or broadened where it makes contact with the tire is that the face of this flattened part serves as a ready means of determining the position upon the rear forks that the clips should be secured in when the brake is applied to the wheel, for it is necessary that the face of the bail should bear against the tire flatly when depressed for application of the brakes, and by depressing it by hand when the brakes are applied the clips will be forced to their proper position on the rear forks, and no further adjustment is necessary. Of course this is not necessarily true where the bail has no flattened portion, but is round or has any round surface applied thereto, for in such case the position of the clips on the rear fork will depend upon the position it is desired the bail shall assume when out of play, which position would depend upon the slack in the chain and the amount of movement of the bail desired.

Having thus described my invention, what I claim, and desire to secure by Letters Patent, is—

1. In a brake for chain-driven vehicles, the combination of a brake-bail formed in one piece pivotally secured at its ends respectively to the frame of the machine and constituting a brake-spoon at its center, of a chain-engaging device attached to said bail and a vertically-adjustable connection between said device and the bail, substantially as described.

2. In a brake for chain-driven vehicles, the combination with a brake-bail formed in one piece pivotally secured at its ends respectively to the frame of the machine and constituting a brake-spoon at its center, of a chain-engaging device secured to said bail and a laterally-adjustable connection between said device and the bail, substantially as described.

3. In a brake for chain-driven vehicles, the combination with a brake-bail formed in one piece pivotally secured at its ends respectively to the frame of the machine and constituting a brake-spoon at its center, of a chain-engaging device attached to said bail and a laterally and vertically adjustable connection between said device and the bail, substantially as described.

4. In a brake for chain-driven vehicles, the combination with a brake-bail formed in one piece pivotally secured at its ends respectively to the frame of the machine and constituting a brake-spoon at its center, of a chain-engaging device attached to said bail, and an adjustable connection between said device and the bail, whereby said device may be adjusted vertically, horizontally and laterally, substantially as described.

5. In a brake for chain-driven vehicles, the combination with a brake-bail formed of a single piece pivotally secured at its ends respectively to the frame of the machine and constituting a brake-spoon at its center, of a chain-engaging device connected with said bail at a point between one end thereof and the spoon at the center thereof, substantially as described.

6. In a brake for chain-driven vehicles, the combination with a brake-bail formed in one piece pivotally secured at its ends respectively to the frame of the machine and constituting a brake-spoon at its center, of a chain-engaging device attached to said bail at a point between one end of the spoon at the center thereof, said device being vertically and laterally adjustable, substantially as described.

7. In a brake for chain-driven vehicles, the combination with a brake-bail formed in one piece pivotally secured at its ends respectively to the frame of the machine and constituting a brake-spoon at its center, of a rotary chain-engaging device attached to said bail between one end thereof and the spoon at the center thereof, said device being laterally and vertically adjustable and rotatable on an axis at right angles to its axis of rotation, substantially as described.

HERBERT L. BAILEY.

Witnesses:
F. H. DRURY,
J. H. RAYMOND.